United States Patent [19]
Kohn et al.

[11] Patent Number: 5,739,413
[45] Date of Patent: Apr. 14, 1998

[54] FORCED DILUTION SYSTEM AND METHOD FOR EMISSIONS MEASUREMENT SYSTEMS

[75] Inventors: Bruce R. Kohn; Donald W. Bilsbarrow, both of Tucson, Ariz.; Pradeep R. Tripathi, Stow, Ohio

[73] Assignee: Envirotest Systems, Inc., Sunnyvale, Calif.

[21] Appl. No.: 701,965

[22] Filed: Aug. 23, 1996

[51] Int. Cl.$^6$ .................................................. G01N 21/26
[52] U.S. Cl. ........................................................ 73/23.31
[58] Field of Search ............................ 73/23.31, 23.32, 73/863.03, 864.73

[56] References Cited

U.S. PATENT DOCUMENTS

| | | | |
|---|---|---|---|
| 3,833,305 | 9/1974 | Porter et al. | 356/244 |
| 4,160,373 | 7/1979 | Fastaia et al. | 73/23.31 |
| 4,586,367 | 5/1986 | Lewis | 73/23 |
| 5,337,595 | 8/1994 | Lewis | 73/23.31 |

*Primary Examiner*—Robert Raevis
*Attorney, Agent, or Firm*—Marger, Johnson, McCollom & Stolowitz, P.C.

[57] ABSTRACT

The combination of ambient air, exhaust and premeasured calibration gases is used according to this invention in the analysis of either low or high pollutant concentration gases measured by a single range analyzer. By using ambient air as a diluent and employing its concentration values to generate the Reference Dilution Ratio, $DR_{ref}$, iterative calculations are made to find the Raw Sample Concentration value, $C_{raw}$. The gas diluting/mixing system includes pressure balanced infeed plumbing legs. Each of the legs feeds to respective flow restrictors and a common, downstream mixing "T" fitting. One leg is interconnected to the high concentration emission gas output from the sampling system and high concentration calibration gas. The other leg is interconnected to the diluent gas source, ambient air.

18 Claims, 3 Drawing Sheets

SAMPLE MEASUREMENT

| | DILUTED EMISSION CONCENTRATIONS | RAW EMISSION CONCENTRATIONS |
|---|---|---|
| HC (PPM) | 20 | 200 |
| CO(%) | .10 | 1.00 |
| CO2(%) | 1.4 | 14.0 |

FORCED DILUTION SYSTEM AND METHOD FOR EMISSIONS MEASUREMENT SYSTEMS

FIELD OF THE INVENTION

This invention relates to motor vehicle emissions testing and more particularly to measuring diluted automobile exhaust pollution concentration values and in real-time, correcting for the effects that changes in exhaust gas density have on the dilution in the apparatus.

BACKGROUND OF THE INVENTION

Governmental regulations regarding the specified allowable values of particular pollutants in motor vehicle emissions are becoming increasingly strict. The Environmental Protection Agency, for example, is advocating rigorous new testing, inspection and maintenance procedures applicable on a nation-wide basis to all automobiles and trucks. These technically advanced tests measure emissions while the vehicle is operating under different simulated driving conditions, such as acceleration, cruise, and deceleration. In addition, these tests require sampling and analysis of motor vehicle emissions having a substantial range in the concentration of various pollutants.

Various auto emissions testing systems differ in their degree of sensitivity to pollutant concentrations. Depending upon how the samples are collected and analyzed, different concentration range testing equipment may be employed. For example, under one test, the mass of the vehicle's emission pollutants is measured by collecting all of a vehicle's exhaust and feeding it into an emission analyzer. A sampling tube, connected at its free end to the vehicle's tailpipe, collects the emitted exhaust gas along with a large amount of ambient air which dilutes the exhaust emission, causing the concentrations of the pollutants within the diluted mixture to be relatively low. The analyzer is designed to have optimum accuracy when measuring diluted gases, having low concentrations of pollutants. Such low-range analyzers can only accurately measure pollutant concentrations up to about four percent within a sampled gas. An analyzer's range is different for each pollutant. In a low-range analyzer, the HC can be measured up to 2000 PPM, CO up to 10,000 PPM and $CO_2$ up to 4%.

Another test involves measuring various concentrations rather than the collective mass of the vehicle's exhaust pollutants be measured. A probe is inserted into the exhaust tailpipe to acquire a sample of only the raw emissions with no mixing of ambient air. Thus, the raw emission gas has relatively high concentrations of pollutants, oftentimes approaching thirteen percent. In a high-range analyzer, the HC can be measured up to 12,000 PPM, CO up to 100,000 PPM and $CO_2$ up to 16%.

To provide the capability of making high concentration measurements some testing facilities simply keep a separate high-range analyzer on hand. Significant disadvantages of the separate analyzer approach include increases in system cost, complexity, and calibration time.

Multiple range analyzers capable of sampling and measuring both low and high pollutant concentrations are also available. While multiple range analyzers provide the convenience of a fairly wide range analyzer in a single package, they are also expensive and inherently complex devices. Moreover, the upper range of multiple range analyzers may not be sufficiently high to accommodate pollution concentrations which are occasionally encountered. Lastly, in flowing a high concentration emission through such an analyzer in high range mode, there may be sufficient residual pollutant levels which raises, falsely, the measurements of subsequent tests in the low range mode.

In yet another approach, highly concentrated emission gas sampled during the concentration measurement tests are diluted which is then fed to a low-range analyzer. For example, U.S. Pat. Nos. 4,586,367, and 5,337,595, both issued to Lewis describe diluting exhaust with substantially clean dry air and subjecting the resultant gas with flow rate calibrators. However, the accuracy and consistency of the measurements provided by prior art devices needs improvement. Moreover, the need for clean dry air (zero air) in the prior art devices is a disadvantageous.

In short, a need continues to exist for an economical way to accurately measure component concentrations both in a dilute mixture of gases and in a concentrated mixture of gases. Prior to the present invention, Applicants developed an apparatus in which diluent gas was mixed with the sampled gas to reduce its pollutants concentration so measurements could be made by a low-range analyzer. Generally, Applicants' apparatus includes pressure balanced plumbing legs in the upstream dilution system where mixing of the diluent and sampled gases occurs. The apparatus also includes a computer to make corrections for variability in the density of the gases measured downstream from the dilution/mixing process.

The density changes for which corrections are made result from differences in the relative amounts of pollutants within various sampled emission gases. Gases having different densities flow through the flow restrictors of the diluting/mixing system at different rates; the higher the density, the slower the passage through the restrictor. Density corrective factors are therefore needed to compensate for the slower flow rates of emission gases having relatively higher pollutant concentrations. Without use of the corrective factors, the raw measurements of the analyzer are unacceptably inaccurate.

Prior to this invention, Applicant's apparatus was used with "zero air" as a diluent gas. Unfortunately however, zero air is expensive, and a constant supply must be maintained at all times for the testing to continue. The zero air requirement is capable of causing the shut down of a facility when zero air is unavailable.

SUMMARY OF THE INVENTION

The combination of ambient air, exhaust and premeasured calibration gases is used according to this invention in the analysis of either low or high pollutant concentration gases measured by a single range analyzer. This invention ensures accurate readings of the test gas by applying gas corrective factors or density compensation derived from an ambient air density value in combination with other values to generate pollutant concentration determinations in real-time. By using ambient air as a diluent and employing its density values into density compensation calculations, particularly the Reference Dilution Ratio, $DR_{ref}$, is generated and iterative calculations are made to find the Raw Sample Concentration value, $C_{raw}$.

The gas diluting/mixing system includes pressure balanced infeed plumbing legs. These plumbing legs are used both for preliminary calibration of the gas analyzer and for mixing the emission gases with ambient air during the pollutant concentration measurements. Each of the legs has a forward-pressure regulator therein, feeding to respective flow restrictors and a common, downstream mixing "T" fitting. One leg is interconnected to the high concentration emission gas output from the sampling system. The other leg is interconnected only to the diluent gas source, ambient air.

The output of the analyzer is then delivered to a computer. The computer performs real-time calculations to make density corrections to the collected data using of the pollution concentrations reported from the analyzer.

DETAILED DESCRIPTION OF THE INVENTION

Figure 1:
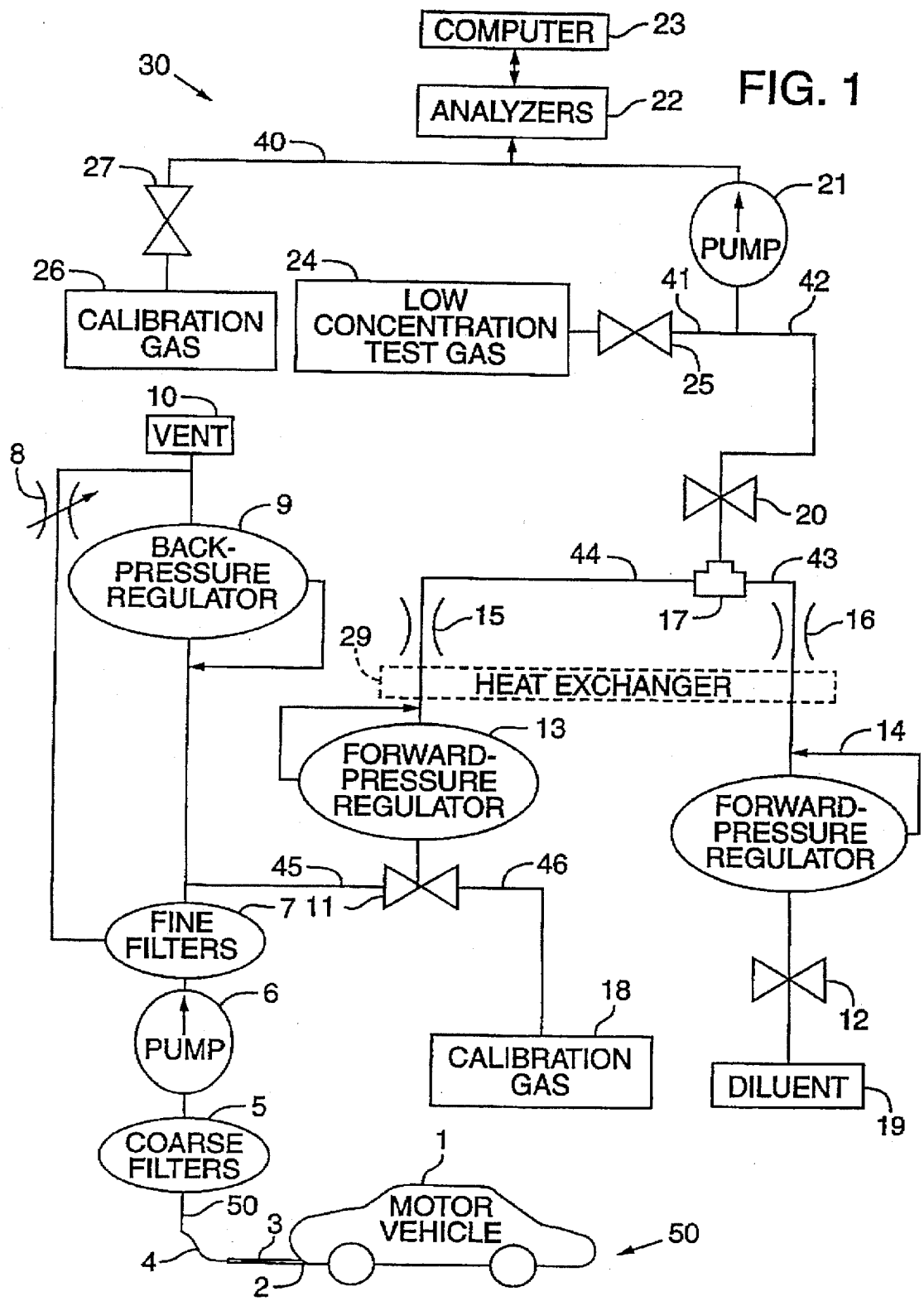
FIG. 1 is a functional block diagram disclosing the major components of the preferred embodiment of the present invention.

Referring to FIG. 1, the block diagram shows a computer (s) 23, analyzers 22 and sources for the gases fed to the analyzers. In particular, calibration gas, low concentration emissions sample gas and high concentration emissions sample are transported to the analyzers at different times. While different sample collection system configurations are within the scope of this invention, the following description illustrates a particular system which can be used for both low and high sample concentration levels.

For emissions with low sample concentration levels, a non-diluted gas plumbing leg 41 transports a source of low concentration test gas 24. The low concentration test gas (LCTG) 24 is emission gas with a pollutant concentration that is low enough for the low-range analyzers 22 to detect/read. The LCTG 24 is currently acquired through conventional mass testing procedures in which large amounts of ambient air are mixed with gas emitted at the vehicle's tailpipe as previously noted. The non-diluted gas plumbing leg 41 includes a source of low concentration test gas 24, a solenoid valve 25, and a pump 21.

However, for emissions with high sample concentration levels, a diluted gas plumbing leg 42 transports gases to analyzers 22 from several sources, that is, diluent gas plumbing leg 43 and dilutant gas plumbing leg 44 which further includes sources raw emission gas plumbing leg 45 and known gas plumbing leg 46. These elements will be discussed in greater detail below.

For preliminary calibration calculations needed to calibrate the system prior to actual emissions sampling, a calibration gas plumbing leg 40 transports calibration gas 26 which is a mixture of gas in which the components and their concentrations are known. Since the component concentrations of the calibration gas 26 are known, its density is used later to generate density correction factors (see step 3 of Table 1 below). The analyzers are therefore adjusted/ calibrated to ensure that they are reading/analyzing accurately. Calibration gas 18 discussed below and calibration gas 26 discussed above are the same substance.

Figures 3, 4:
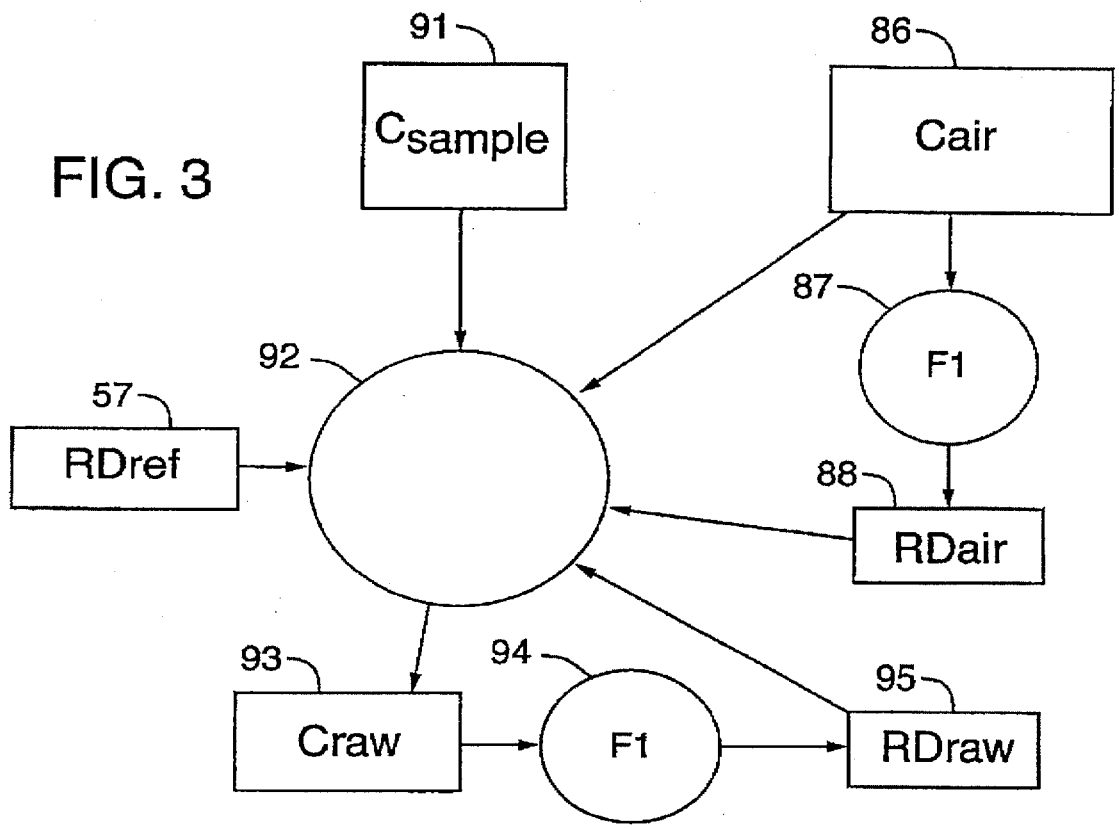
FIG. 3 is a flowchart, representing the algorithm to ensure accurate measurements of the actual raw emission concentrations; and, FIG. 4 shows a typical data display, such as might result from carrying out the testing procedure.

Computer(s) 23 which may be local or remote and is, for example, an IBM compatible with an interface card, such as an ADAC-5040, is used to perform the necessary real-time calculations to adjust for density changes caused by changes in concentrations of the gases in accordance with this invention. FIG. 4 is an example of a sample display of the type that the display monitor of the computer 23 will display to the user during the testing procedure.

Analyzers 22 which are in communication with the computer(s) 23 send data representing component concentrations of a particular gas to the computer(s) 23. The analyzers 22 are, for example, the conventional, low range type which accurately determine concentrations when the gas being analyzed has a low concentration of pollutants. The analyzers 22 operate by directing some or all of the gas through a chamber which is able to detect the pollutant concentrations in the gas. The analyzers 22 react with increasing concentrations by sending increased voltage signals to the computer 23. The signals are then converted into binary values representing the voltage. The computer 23 has a database that relates voltages to concentrations, thereby allowing the computer 23 to find a concentration value corresponding to the binary voltage value. There are other analyzers that can also be utilized with this system. For example, another type of suitable analyzer utilizes serial communications or other "smart" interfaces for interrogating the analyzers and retrieving the data.

The motor vehicle 1, having emissions emerging from the exhaust tailpipe 2, is the source of the raw emission gas 50. To sample the emissions, sample probe 3, connected to the sample line 4, is inserted into the exhaust tailpipe 2 to collect the raw emission gas 50. The raw emission gas 50 is first drawn through a coarse filter 5 in order to remove large particles from the gas and thereby protect the pump 6 which serves to pressurize the raw emission gas 50 and to provide an adequate flow rate for improved response times. Next, the raw emission gas 50 is fed through a fine filter 7, to remove smaller particles so as to protect down stream plumbing and the analyzers 22. In the preferred embodiment, there is a bleed valve 8 connected to the fine filter 7. The bleed valve 8 keeps the fine filter 7 free of condensate. The small amount of gas that escapes through the bleed valve 8 is passed to the outside through vent 10.

Back-pressure regulator 9, located along the raw emission gas plumbing leg 45 just prior to vent 10, is preferably set to a pressure slightly greater (2 to 3 psi gauge) than the 15 psi gauge pressure at the forward-pressure regulator 13. Therefore, a pressure of 17 to 18 psi gauge at the back-pressure regulator 9 is preferred. The back-pressure regulator 9 allows any excess volume of raw emission gas 50 to flow to vent 10.

When there are low sample concentration levels from motor vehicle 1, the non-diluted gas plumbing leg 41 transports a source of low concentration test gas 24 to the analyzer as described above. However, when there are high concentration levels from motor vehicle 1, diluted gas plumbing leg 42 transports to the analyzers emissions gases, plus ambient air and calibration gases. To combine emissions with calibration gas, solenoid valve 11, when selectively activated by the operator (or automatically activated), will allow the calibration gas 18 mixed with the raw emission gas 50 (legs 45 and 46).

When raw emission gas 50 and the pressurized calibration gas 18 are combined, they are transported by dilutant leg 44 which is coupled with diluent leg 43 by mixing tee 17 where they are combined with the diluent 19 which is ambient air. The pollutants in the ambient air are measured and taken into account in the calculations described below. This invention takes advantage of the monetary savings that can be obtained from using ambient air from a compressor instead of the zero/pure air. Thus, in order to use the same low-range analyzers 22 to test raw emission gas having a relatively high concentration of pollutants, the diluted gas plumbing leg 42 and then plumbing leg 40 referred to above receives emissions from an automobile 1 in combination with diluent gases.

By maintaining the same pressure for both the dilutant orifice 15 and the dilutant orifice 16, the concentrations of the gases will be able to be determined, in the manner discussed below, since pressure will have been eliminated as a variable. The preferred embodiment enables the forward pressure regulator 13 to provide at least fifteen pounds per square inch (15 psi gauge) of pressure to the gas which flows through the predetermined sized restriction orifice 15. At approximately 15 psi gauge, the flow velocity of gas through the restriction orifice 15, will be sonic (speed of sound). The force dilution apparatus does not require the flow to be sonic. However, by having the velocity sonic, system stability is enhanced.

The solenoid valve 12, when activated, allows the diluent 19 to flow freely into the forward-pressure regulator 14. The preferred embodiment enables the forward-pressure regulator 14 to provide a gauge pressure of at least fifteen pounds per square inch (15 psi gauge) to the diluent air which passes through the restriction orifice 16. Having the diluent air flowing at a pressure of 15 psi gauge ensures that the flow through the restriction orifice 16 is critical or sonic (the speed of sound). The forced dilution apparatus does not require the flow to be sonic. However, having the velocity sonic provides stability to the system since, after the velocity of the flow becomes sonic, the standard volume flow (the actual volume after the temperature and pressure have been brought to standard values) varies linearly with pressure. If, on the other hand, the velocity were subsonic, the standard volume flow would increase with the square of the pressure and would be less stable.

Restriction orifice 16 constricts the flow of diluent gas. The orifice 16 can simply be a hole drilled through a metal plumbing fitting. However, the orifice 16 could be any type of restriction, such as a venturi, a nozzle or other type of apertured fitting. The dilutant gas plumbing leg 44 includes also includes a restriction orifice 15, comparable in construction and function to the restriction orifice 16.

The heat exchanger 29 is a passive element, which, if ambient conditions require it, will maintain the diluent leg 43 and the dilutant leg 44 at substantially the same temperature. The heat exchanger 29 may be of any suitable form. For example, it could simply consist of physically putting the plumbing tubes for each leg 43 and 44 in contact with each other so that by the end of the flow, the temperature differences have been minimized; or running the tubes of each leg 43 and 44 through a water bath, bringing both flows to the temperature of the water. The actual temperature is not important, just that the two legs 43 and 44 have substantially the same temperature.

The gas flow through the restriction orifices 15 and 16 is characterized by a function dependent on pressure, temperature and densities of the gases. As described above, the forward-pressure regulators 13 and 14 along with orifices 15 and 16 will maintain the same pressure between the diluent leg 43 and dilutant leg 44; and the heat exchanger 29, if necessary, will maintain substantially the same temperature.

Thus, since the pressure and temperature between the two legs will be substantially identical, the resulting diluted gas flow exiting from the mixing tee 17, and passing through the solenoid valve 20 and into the analyzers 22, is the sum of the flow from both legs 43 and 44. By knowing this resulting flow and the dilution ratio between the two legs, the raw emission concentrations can be calculated, taking density variations into account.

As discussed above, this invention provides an apparatus and method that compensates for the flow changes which result from density variations in high pollutant concentrated raw emission which utilizes ambient air as a diluent. While this invention has been discussed with reference to the embodiment of FIG. 1, this invention may be utilized and operated in conjunction with any suitable emissions testing arrangement.

Prior to any emission sample concentration calculation, the system is first calibrated by flowing a known calibration gas through the dilution apparatus and measuring the dilute calibration concentrations 85. Following calibration, the Reference Dilution Ratio, $DR_{ref}$, is generated and iterative calculations are made to find the emissions' Raw Sample Concentration value, $C_{raw}$.

Directly below is a table which gives an example calculation, and which is instructive when considering the flowcharts, both of FIG. 2 and FIG. 3. Note that "span" refers to the known calibration gas 18 (and 26), and below they are used interchangeably.

TABLE 1

| | HC | CO | $CO_2$ | Gas | Item | Tag | Action |
|---|---|---|---|---|---|---|---|
| 1 | 2 | 7 | 0.010 | | $C_{air}$ | 86 | Measure 19 |
| 2 | 163 | 804 | 0.321 | | $C_{cal}$ | 85 | Measure (18,26) + 19 |
| 3 | 1608 | 8022 | 3.229 | | $C_{span}$ | 83 | Measure (18,26) |
| 4 | 8.975 | 9.056 | 9.350 | 9.127 | $DR_{cal}$ | | [84] - $(C_{cal}-C_{span})/(C_{air}-C_{cal})$ |
| 5 | 1.47 | 0.967 | 1.519 | | $RD_{gas\_xx}$ | | RD constant for each gas |
| 6 | | | | 1.00005 | $RD_{air}$ | 88 | [87] - Formula 1 on $C_{air}$ |
| 7 | | | | 1.00172 | $RD_{span}$ | 81 | [82] - Formula 1 on $C_{span}$ |
| 8 | 8.960 | 9.041 | 9.335 | 9.112 | $DR_{ref}$ | 57 | [79] - $DR_{cal}*(RD_{air}/RD_{span})$ |
| 9 | 80 | 400 | 1.400 | | $C_{sample}$ | 91 | Measure 50 + 19 |
| 10 | | | | 1 | $RD_{raw}(1)$ | 95 | Assume 1 ($C_{raw}=0$) |
| 11 | 791 | 3981 | 14.065 | | $C_{raw}(1)$ | 93 | [92] - $DR_{ref}*[(RD_{raw}/RD_{air})*(C_{sample}-C_{air})] + C_{sample}$ |
| 12 | | | | 1.04882 | $RD_{raw}(1)$ | 95 | [94] - Formula 1 |
| 13 | 825 | 4156 | 14.684 | | $C_{raw}(2)$ | 93 | [92] - $DR_{ref}*[RD_{raw}/RD_{air})*(C_{sample}-C_{air})] + C_{sample}$ |
| 14 | | | | 1.07646 | $RD_{raw}(2)$ | 96 | [94] - Formula 1 |
| 15 | 845 | 4156 | 15.034 | | $C_{raw}(3)$ | 93 | [92] - $DR_{ref}*[(RD_{raw}/RD_{air})*(C_{sample}-C_{air})] + C_{sample}$ |
| 16 | | | | 1.07828 | $RD_{raw}(3)$ | 95 | [94] - Formula 1 |

TABLE 1-continued

| | HC | CO | CO$_2$ | Gas | Item | Tag | Action |
|---|---|---|---|---|---|---|---|
| 17 | 846 | 4261 | 15.057 | | C$_{raw}$(4) | 93 | [92] - DR$_{ref}$*[(RD$_{raw}$/RD$_{air}$)*(C$_{sample}$-C$_{air}$)] + C$_{sample}$ |
| 18 | | | | 1.07840 | Rd$_{raw}$(4) | 95 | [94] - Formula 1 |
| 19 | 846 | 4262 | 15.058 | | C$_{raw}$(5) | 93 | [92] - DR$_{ref}$*[(RD$_{raw}$/RD$_{air}$)*(C$_{sample}$-C$_{air}$)] + C$_{sample}$ |
| 20 | | | | 1.07841 | RD$_{raw}$(5) | 95 | [94] - Formula 1 |
| 21 | 846 | 4262 | 15.058 | | C$_{raw}$(6) | 93 | [92] - DR$_{ref}$*[(RD$_{raw}$/RD$_{air}$)*(C$_{sample}$-C$_{air}$)] + C$_{sample}$ |

Figure 2:
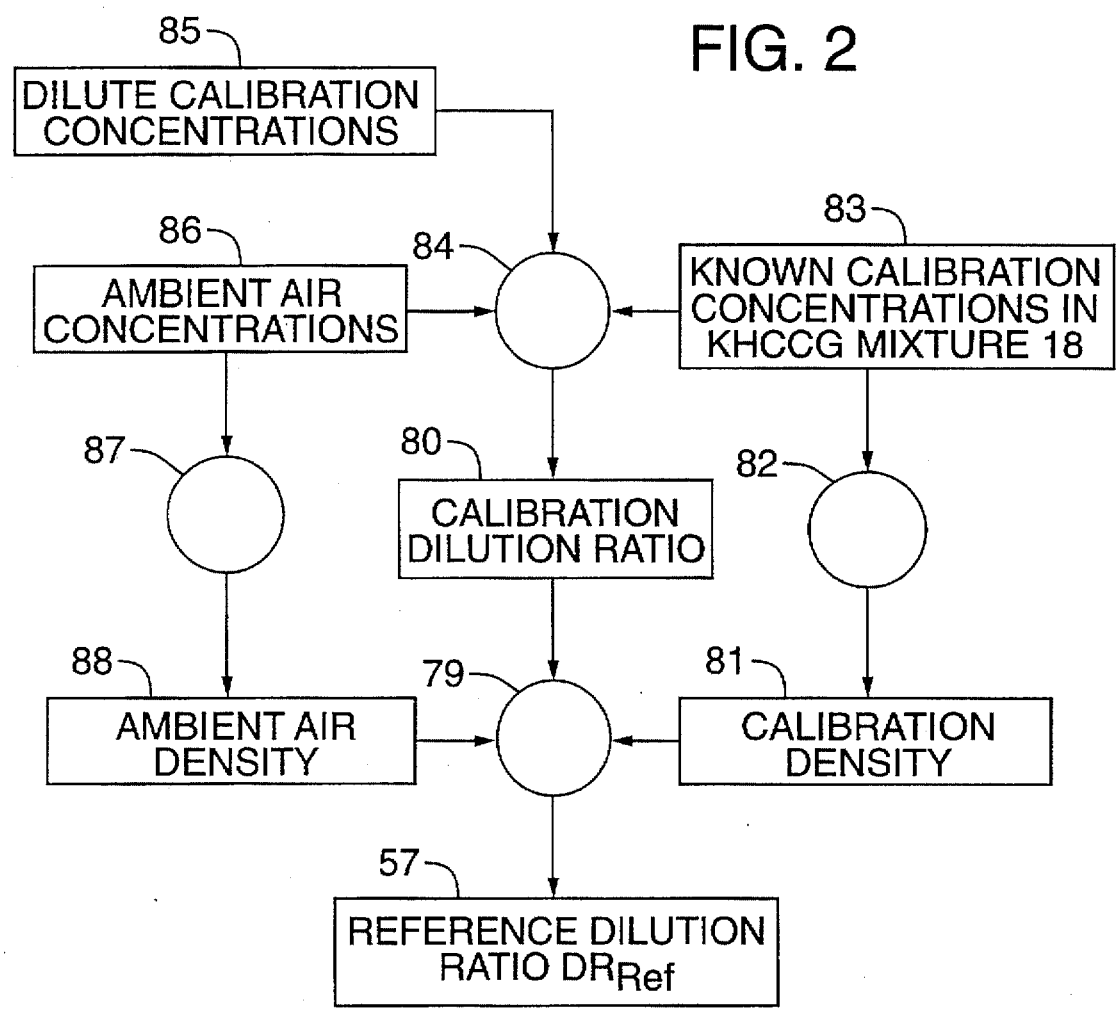
FIG. 2 is a diagrammatic representation of the algorithm used in the preferred embodiment to generate density correction factors, using ambient air as a diluent.

Reference is now made to FIG. 2, which is a flowchart of the method which adjusts for density, and to Table 1 as well as FIG. 1. Referring to step 1 of Table 1, and referring to the diluent, ambient air 19, the pollution levels are measured, including HC and CO which is measured in parts per million and CO$_2$ which is measured as a percentage to obtain C$_{air}$ 86. In step 2, for calibration, the known span 18,26 is mixed with ambient air 19 to measure for the dilute calibration concentrations C$_{cal}$ 85. As shown in step 3, the values of calibration gases C$_{span}$ 83 (see also FIG. 1, elements 18,26) are provided.

In FIG. 2 and step 4, based on the known calibration concentrations C$_{span}$ 83 the dilute calibration concentration C$_{cal}$ 85 and measured ambient air concentrations, C$_{air}$ 86, at circle 84 calculations are made which provide the calibration dilution ratio 80, DR$_{cal}$=(C$_{cal}$-C$_{span}$)/(C$_{air}$-C$_{cal}$). The value for DR$_{cal}$ shown in step 4 of Table 1 is the average value of the combination of the values under the columns for HC, CO and CO$_2$.

At step 5, a constant for each gas is obtained. The respective relative densities of the gases are then considered, where RD$_{air}$ and RD$_{span}$ are calculated at circles 87 and 82 respectively. The formula for calculating the relative densities is as follows:

Formula 6:
$$RD_{raw, \text{ span or air}} = 1 + C_{HC}*0.000001*(RD_{gas\_HC} - 1) + C_{CO}*0.000001*(RD_{gas\_CO} - 1) + C_{CO2}*0.01*(RD_{gas\_CO2} - 1),$$

RD$_{gas\_xx}$ relating to the particular gas components of the raw gas, span or air. The values of RD$_{air}$ 88 and RD$_{span}$ 81 are used to provide the reference dilution ratio, DR$_{ref}$=DR$_{cal}$*(RD$_{air}$/RD$_{span}$) which is therefore calculated at circle 79 of the flowchart of FIG. 2. The value for DR$_{ref}$ shown in step 8 of Table 1 is the average value of the combination of the values under the columns for HC, CO and CO$_2$.

Now referring to FIG. 3 and step 9, in the sampling mode, raw concentrations 93 are computed in real-time by first considering their measured values, that is, dilute sample concentration, C$_{sample}$, 91 obtained by measuring the output of raw gas 50 diluted with ambient air 19. In step 10, by assuming that C$_{raw}$=0, a calculation involving formula 1 above would generate a value RD$_{raw}$=1. The concentration values of the gas components represented by C$_{air}$ 86 are used with formula 1 to obtain RD$_{air}$. At circle 92, DR$_{ref}$ 57, C$_{sample}$, and RD$_{air}$ are therefore employed to obtain a value for the first iteration of C$_{raw}$ (see also step 11). The C$_{raw}$ value 93 obtained through calculations of circle 92 is then processed by the computer's processor to generate an adjusted DR$_{ref}$. By employing formula 1 at circle 94 to generate a new RD$_{raw}$, calculations of circle 92 use the adjusted DR$_{ref}$ to generate an adjusted C$_{raw}$ in steps 11, 13, 15, 17, 19 and 21.

The iterative calculations made in steps 11–21 result in C$_{raw}$ 93 quickly converging on a particular value for each gas. Once the values have converged, the readings are output to the computer display, and they may also concurrently be stored or printed for hard copy.

FIG. 4 depicts a sample visual display given by computer 23, at the completion of the test. In the display, "ppm" indicates "parts per million" and % indicates a percentage that the particular pollutant concentration bears to the entire gas. Both the diluted emission concentrations and the raw emission concentrations are provided for HC, CO, and CO$_2$.

Accordingly, by using a combination of ambient air, exhaust and prepared calibration gas, a low-range analyzer may be used for high-range emissions concentrations. Calculations involving ambient air are made to generate a density correction factor, DR$_{ref}$, which corrects for density fluctuations in real-time. The order of the steps and configuration of the apparatus described includes all variations where emissions gas is diluted with ambient air, preferably so that it may be analyzed by a low-range analyzer. While an embodiment has been generally described for use with the sampling and analyzing of auto emissions, this invention is applicable to any type of gas concentration sampling and analyzing where ambient air is used as a diluent, such as the testing of the emissions of jets, boats, lawn mowers and smoke stacks.

What is claimed is:

1. A method for compensating for the effects that changes in exhaust gas density have on the dilution of exhaust gas in an emissions sampling system, comprising the steps of:

from ambient air concentration measurements, generating an ambient air density value; and employing said ambient air density value to generate a reference dilution ratio.

2. A method as recited in claim 1 wherein a calibration dilution ratio and a calibration gas density value are provided, said method further comprising the step of:

employing said calibration dilution ratio and said calibration gas density value to generate said reference dilution ratio.

3. A method as recited in claim 1 further comprising the step of:

measuring diluted emissions to obtain diluted emission concentration values; and employing said reference dilution ratio and said diluted emissions concentration values to generate raw emissions concentration values.

4. A method as recited in claim 1 further comprising the step of:

providing an adjusted reference dilution ratio; and employing said adjusted reference dilution ratio to generate an adjusted raw concentration value.

5. A method as recited in claim 1 further comprising the step of:

providing said ambient air in a compressed form.

6. A method as recited in claim 1 wherein said exhaust gas is highly concentrated exhaust gas, further comprising the step of:

provising ambient air in a manner which dilutes said highly concentrated prior to said highly concentrated exhaust gas being analyzed by a low-range analyzer.

7. An apparatus for compensating for the effects that changes in exhaust gas density have on the dilution of exhaust gas in an emissions sampling system, comprising:

a sampling device for sampling ambient air to generate an ambient air density value;

a processor for employing said ambient air density value to generate a reference dilution ratio.

8. An apparatus as recited in claim 7 wherein a calibration dilution ratio and a calibration gas density value are obtained, said apparatus further comprising:

a processor for employing said calibration dilution ratio and said calibration gas density value to generate said reference dilution ratio.

9. An apparatus as recited in claim 7 further comprising:

an analyzer for measuring diluted emissions to obtain diluted emissions concentrations values; and a processor for employing said reference dilution ratio and said diluted emissions concentration values to generate raw emissions concentration values.

10. An apparatus as recited in claim 7 further comprising:

a processor for providing an adjusted reference dilution ratio; and a processor for employing said adjusted reference dilution ratio to generate an adjusted raw concentration value.

11. An apparatus as recited in claim 7 wherein said ambient air is provided in a compressed form.

12. An apparatus as recited in claim 7 wherein said exhaust gas is highly concentrated exhaust gas, further comprising:

a plumbing arrangement for providing ambient air in a manner which dilutes said highly concentrated exhaust gas prior to said highly concentrated exhaust gas being analyzed by a low-range analyzer.

13. An apparatus for compensating for the effects that changes in exhaust gas density have on the dilution of exhaust gas in an emissions sampling system, comprising:

means for generating an ambient air density value from ambient air concentration measurements; and means for employing said ambient air density value to generate a reference dilution ratio.

14. An apparatus as recited in claim 13 wherein a calibration dilution ratio and a calibration gas density value are obtained, said apparatus further comprising:

means for employing said calibration dilution ratio and said calibration gas density value to generate said reference dilution ratio.

15. An apparatus as recited in claim 13 further comprising the step of:

means for measuring diluted emissions to obtain diluted emissions concentration values; and means for employing said reference dilution ratio and said diluted emissions concentration values to generate a raw emissions concentration values.

16. An apparatus as recited in claim 13 further comprising:

means for providing an adjusted reference dilution ratio; and means for employing said adjusted reference dilution ratio to generate an adjusted raw concentration value.

17. An apparatus as recited in claim 13 further comprising:

means for providing said ambient air in a compressed form.

18. An apparatus as recited in claim 13 wherein said exhaust gas is highly concentrated exhaust gas, further comprising:

means for providing ambient air in a manner which dilutes said highly concentrated exhaust gas prior to said highly concentrated exhaust gas being analyzed by a low-range analyzer.

* * * * *